C. C. WORTHINGTON.
LAWN MOWER.
APPLICATION FILED DEC. 20, 1915.
1,347,569.
Patented July 27, 1920.
3 SHEETS—SHEET 1.
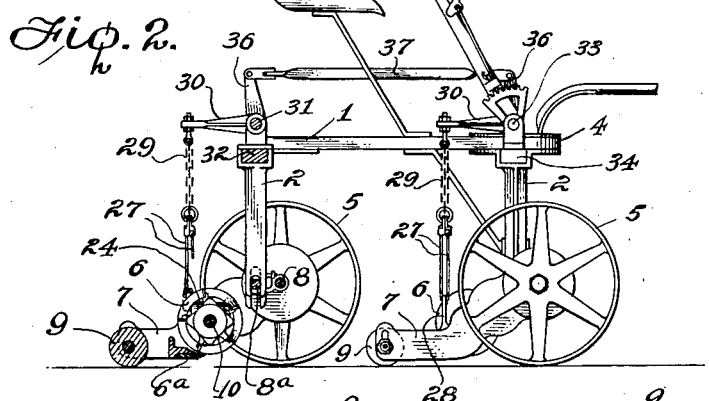
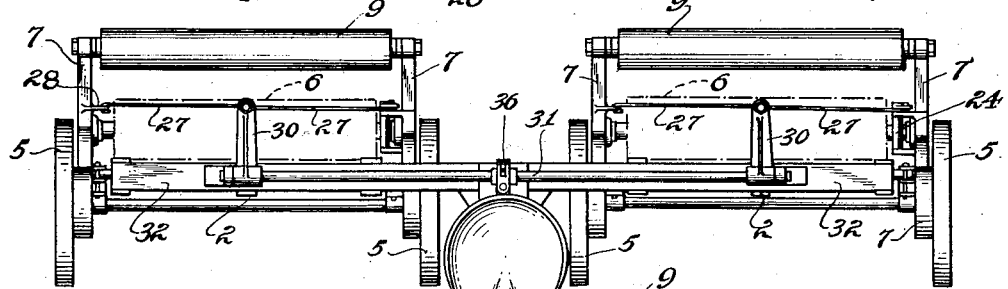
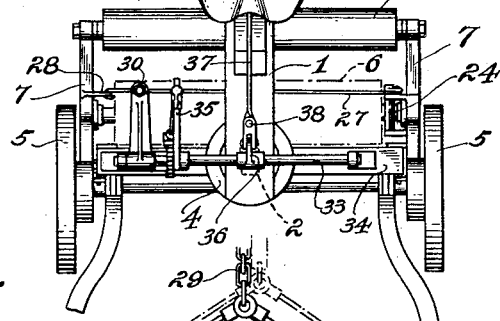
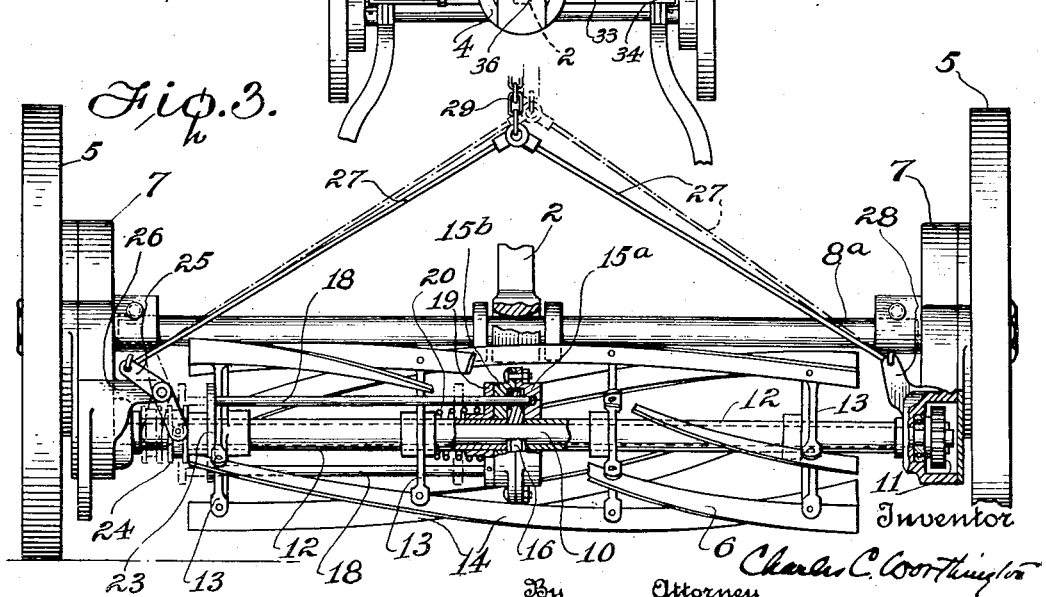

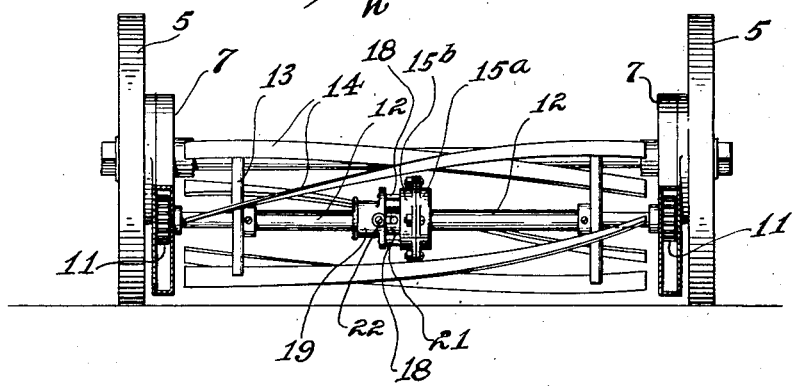
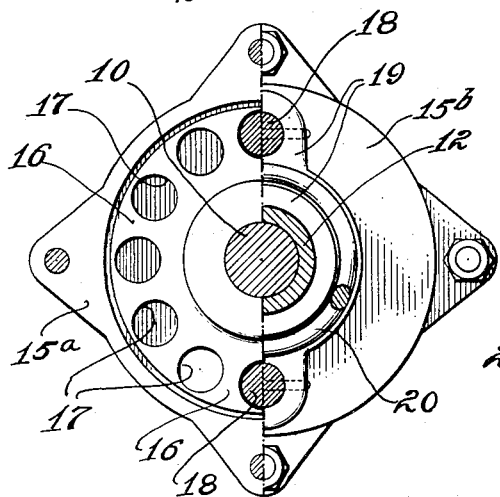
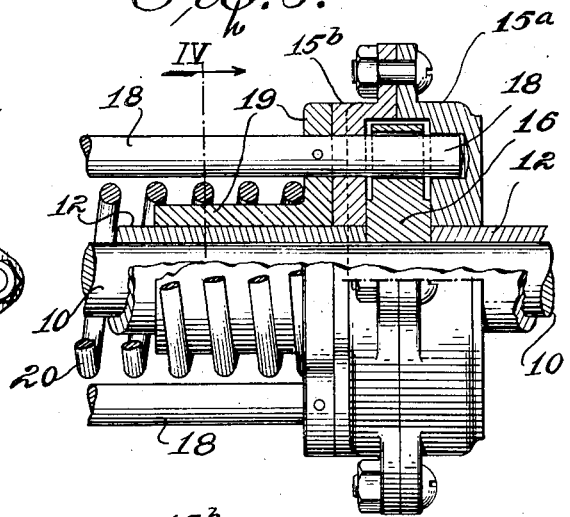
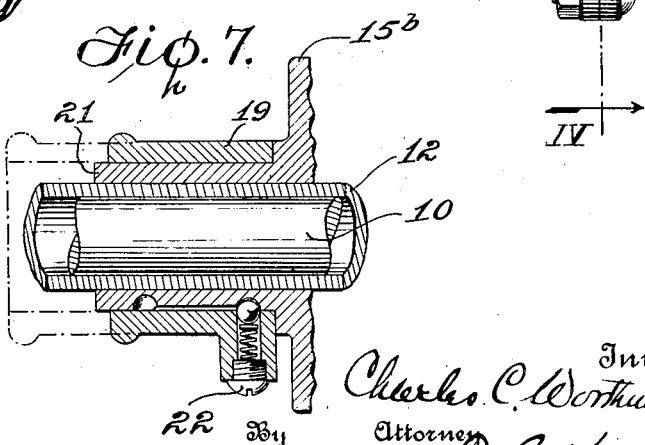

C. C. WORTHINGTON.
LAWN MOWER.
APPLICATION FILED DEC. 20, 1915.
1,347,569.
Patented July 27, 1920.
3 SHEETS—SHEET 3.
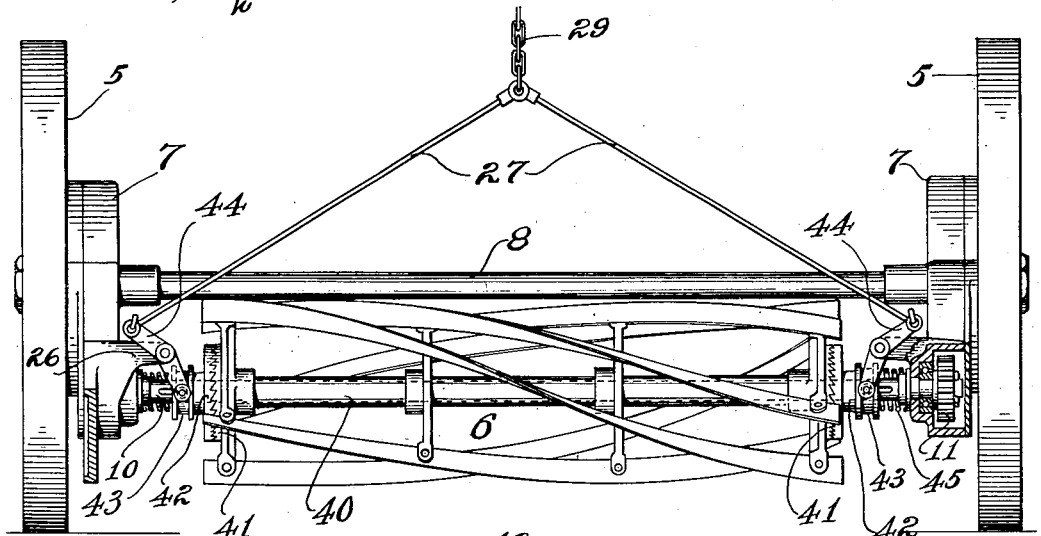
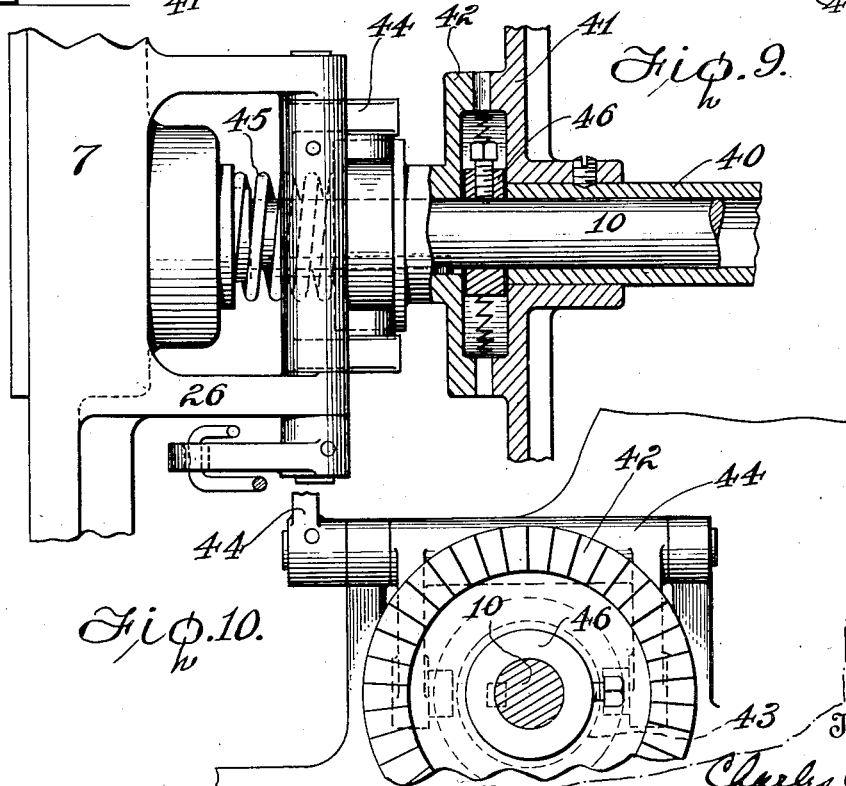

UNITED STATES PATENT OFFICE.

CHARLES C. WORTHINGTON, OF DUNFIELD, NEW JERSEY, ASSIGNOR TO SHAWNEE MOWER COMPANY, OF NEW YORK, N. Y., A CORPORATION OF PENNSYLVANIA.

LAWN-MOWER.

1,347,569.　　　　Specification of Letters Patent.　　Patented July 27, 1920.

Application filed December 20, 1915. Serial No. 67,699.

*To all whom it may concern:*

Be it known that I, CHARLES C. WORTHINGTON, a citizen of the United States, residing at Dunfield, New Jersey, have invented the following-described new and useful Improvements in Lawn-Mowers.

The invention is concerned with the interruption of the driving connection to the rotary cutter mechanism of lawn mowers, to permit them to be moved about from place to place with the said mechanism in an idle condition so as to save wear on the knives and their possible injury from the frictional heat developed by idle operation. The invention consists in the location of the releasing or disconnecting mechanism in the structure of the mower, and in the principle of operation and construction of such means, and also in the coördination of the same with the means for lifting the cutter mechanism from the ground, and likewise in the organization of such or any releasing and lifting means in gang lawn mowers, such as disclosed, for example, in my prior patent application Serial No. 803,296, whereby the cutters of several mowers may be released, or coincidentally released and lifted, by a single act by the operator, all as hereinafter fully explained and more particularly pointed out in the claims.

In the accompanying drawings:

Figure 1 represents a plan view, more or less diagrammatic, of a gang lawn mower;

Fig. 2 a side elevation thereof;

Fig. 3 a rear view, on larger scale, of one of the mower units of Fig. 1, with parts in section;

Fig. 4 a section on line IV—IV of Fig. 5;

Fig. 5 an enlarged scale part sectional view of the clutching means;

Fig. 6 a rear elevation, partly sectional, of a mower unit supplied with the clutching mechanism of Figs. 4 and 5, adapted for individual operation.

Fig. 7 an enlarged longitudinal cross section through the hand-operated member of Fig. 6;

Fig. 8 a rear view of a mower supplied with a modified form of clutch device;

Fig. 9 a larger scale detail of the clutch mechanism thereof; and

Fig. 10 a face view of one of the clutch elements in this form.

Figs. 1 and 2 may be understood to represent any form of gang lawn mower in which the individual mower units are held in echelon formation by means of a main frame 1 and so as to cut a swath which is substantially as wide as the aggregate of their individual swaths. Each of these units is supplied with a releasing means in the form of a clutch and connections therefrom whereby it may be actuated by the operator, carried on a seat on the frame. In the particular machine illustrated the main frame rests, by its three vertical bearing posts 2, upon substantially central points of the frame of each of three mower units, at which points the engagement between post and unit forms a pivotal joint with a horizontal axis, as illustrated in Fig. 3, and which allows the unit to tilt vertically about said horizontal axis, permitting it to accommodate undulating or irregular lawn surface. The mowers are arranged two in rear and one in front and the main frame includes a fifth-wheel joint 4, placed directly over the post-bearing of the forward unit so that the machine may easily turn corners. Shafts or thills are provided so that the machine may be horse-drawn, and various other details and appurtenances may be understood as present according to the principles sufficiently described in the aforesaid prior application.

Each mower unit comprises a pair of ground wheels 5 geared to drive a rotary cutter reel 6 at high velocity and against the edge of a coöperating dead knife 6ª. The driving gear for this purpose is housed within the side plates 7 and, inasmuch as it may be comprised of any usual or suitable form of ratchet gear train, is not particularly illustrated in the drawings. The two side plates or gear housings 7 are united by a rigid cross-rod 8, commonly termed the axle, and also by the bed of the dead knife and with these parts constitute what may be termed the frame of the unit. The wiper roller 9 is journaled in this frame immediately in rear of the cutter mechanism and this roller and the two ground wheels constitute the means whereby the mower unit rests on the ground when engaged in cutting, but by swinging the mower frame upwardly, about the axis of the ground wheels, the cutter mechanism may be lifted from the ground and it is lifted to an elevated position whenever it is desired to drive the machine over ground surface not intended to be mowed. The post-bearings, referred to above, rest, in the present case, upon the centers of an auxiliary axle rod 8<sup>a</sup> mounted in or forming part of the frame of each unit just in rear of the axle 8, and the weight of the superposed framework is thus exerted partly in creating the necessary traction for the ground wheels 5 and partly in pressing the wiper roller 9 upon the ground which keeps the cutter mechanism resiliently pressed toward its proper cutting position, this method of holding the cutters to their work being the subject of another application and not claimed herein.

According to the present invention, the means for lifting the cutter mechanism out of cutting relation to the ground serves also to shift the driving clutch element of the mower unit to its non-driving position, so that whenever the cutter is lifted from the ground it remains idle for as long as lifted, although it is equally within the invention to effect the said clutching and lifting operation independently, or the former without the latter, as will be made apparent in the claims.

Disconnection of the cutter reel from its driving source is accomplished according to the preferred embodiment of the invention, at a point between the cutter shaft and the reel itself and is therefore independent of the gearing contained within the side housing 7, which gearing, in consequence, can remain completely protected and incased in the side housings as customary and desirable. The cutter shaft 10 is journaled in the side housings 7, and the pinions 11 at its ends constitute the terminal elements of the incased gear trains, above referred to, one or both of which may serve to drive the shaft according to the usual design. The cutter reel is formed as an independent structure concentrically surrounding the cutter shaft 10 and suitably supported in the proper relation to its dead knife. It is preferably supported directly on the cutter shaft 10 by being sleeved snugly thereon so as to partake of the stiffness of the shaft, and for this purpose it is made up of two tubular sleeve sections 12, united by means of two housing parts 15<sup>a</sup> and 15<sup>b</sup>, which are secured to each section and bolted or riveted together as indicated in Fig. 5. The hubs of the spiders 13 are secured to the sections 12, the spiral knives 14 being held by the arms of the spiders, and the whole structure is free to revolve relatively on the shaft except as connected thereto by the clutch elements which are contained within the space inclosed by the two housing parts 15<sup>a</sup> and 15<sup>b</sup>. This inclosed space accommodates a hub or disk 16 rigidly fixed to the cutter shaft and provided with a ring of sockets or holes 17 which represent one of the clutch elements. A rod or a pair of rods 18 slidingly mounted in the housing and adapted to enter these sockets, represent the other clutch element. These rods are fitted snugly to their bores in the housing part 15<sup>b</sup> so as to prevent entrance of dirt to the interior chamber, and when shifted so as to enter the sockets 17 connect the shaft and cutter reel so that the two revolve as a unit. The location of the clutch disk and its housing at the approximate center of the reel structure results in an equal distribution of the driving force to the knives 14 and avoids the strain or possible distortion that might otherwise result from some other location of a single driving connection. The rods 18 are carried by a sliding collar 19, which in the form shown in Figs. 4 and 5, is mounted to slide directly upon one of the tube sections 12, but in the form of Figs. 6 and 7 slides on a boss 21 of the housing part 15<sup>b</sup>. In this latter case the collar 19 and its driving elements 18 are intended to be directly shifted by hand, for which purpose the boss of the collar is provided with a spring detent 22 adapted to engage recesses in the boss of the housing to retain the rods in their driving or non-driving position, see particularly Fig. 7. In Figs. 4 and 5 the sliding collar 19 is urged to its driving position by a spring 20 which has its other abutment against the adjacent spider hub, and the rods are extended longitudinally toward the end of the reel, where they are connected to a yoke or ring 23, forming part of a lever-shifted collar 24, mounted to slide on the end of the cutter sleeve 12. The forked clutch-lever 25 engages the groove of this collar and is adapted to shift the clutch rods, even though the cutter reel be in motion, or in any event without requiring the hand to be thrust between the cutter knives, as in the case of Fig. 6. The lever 25 is fulcrumed on a bracket 26 projecting from one of the gear housings 7, and is preferably of bell crank form so that upward pull on its power arm will serve to release the reel against the tension of the spring, and so that the same upward pull, continued, may act through said lever to lift the cutter mechanism from the ground.

In the gang mower represented by Figs. 1 and 2, the bell-crank clutch-lever is operated by one side of a bridle 27 connected thereto, and to a lug 28, on the opposite housing, the middle of the bridle being connected by a chain 29 to an operating member mounted on the main frame of the mower. Obviously, various forms of mechanical contrivances can be utilized to exert the power necessary for shifting the clutch elements 18, and for transmitting the motion thereto. The preferred means consists of a lever arm 30, mounted over each unit, the arms for the two rear units being fast on a rock shaft 31 journaled on the cross-piece 32 of the superposed framework, and the arm for the forward mower being similarly mounted on a rock shaft 33 journaled on the front cross-piece 34. This rock shaft 33 is supplied with a latch lever and segment 35 as its operating agency, and such operation is transmitted to the rear rock shaft by cranks 36 and a connecting rod 37, so that both shafts move together and all of the mower units in the machine may be simultaneously and similarly controlled. Inasmuch as the two rock shafts are on opposite sides of the fifth-wheel joint, the connecting rod 37 is provided with a joint 38 near its forward end and in such position as substantially to coincide with the axis of the fifth-wheel joint when the control lever has been thrust forward and the cutter mechanism lifted from the ground. The fifth-wheel may thus turn freely without disturbing the connecting rod or the position of any of the parts. In its other positions, indicated in Fig. 2, the connecting rod is normally free of strain and the natural looseness of the connections and the flexibility of the rod itself are sufficient to compensate for any disalinement of the joint 38 from the fifth-wheel axis. The latch lever 35 may be assumed to represent any suitable means for rocking the shafts and retaining the mower units in lifted position, it being evident that the jointed connecting rod will function as above described regardless of the character of the means which operates it. The operation of the said actuating means raises the cutter mechanism of all the mower units and disconnects them from their driving gears, the driving relation being restored as soon as the cutting mechanism is lowered. It is to be noted moreover, that the tension of the spring 20 may be relatively so proportioned as to yield and release the cutter before the lifting of the frame of the unit, or only after the said frame has reached some predetermined elevation, as determined by a stop, thereby permitting the mower units to be kept in action even though the wiper rollers be lifted out of contact with the ground, and as is sometimes desired for giving a long cut to the grass, longer than the setting of the wiper roll in its frame slots would prescribe.

Referring to the modified form shown in Figs. 8 to 10, the cutter reel 6 is built up on a single tube section 40 sleeved upon the cutter shaft 10 and provided with clutch faces 41 rigidly fixed at both ends, and adapted to interlock with corresponding clutch members 42 mounted to slide longitudinally on the cutter shaft 10 and to rotate therewith. The reel is held against endwise displacement by collars 46 at its ends, set-screwed to the cutter-shaft, and the sliding clutch members are each provided with a fork groove 43, as in the case already described, said groove being engaged by bell-crank levers 44 to thrust the clutch members inwardly to drive the reel. Both levers are connected by the bridle 27 and chain 29, to a lever such as 30 controlled by the operator as before, the general mode of operation being essentially as already described except that the reel is driven at both ends instead of at the middle. The releasable driving connection in both cases, however, is between the cutter shaft and the cutter reel, with the advantage already alluded to, and in both cases it can be shifted by the operator without descending from his seat, and by means of connections which are independent of the turning of the fifth-wheel.

I claim:

1. A lawn mower comprising a cutter shaft, a cutter reel, and a clutch between said shaft and reel.

2. In a gang lawn mower the combination of a mower unit having a cutter shaft, a cutter reel, a clutch whereby the former drives the latter, a gang frame and operating connections mounted thereon and extending to said clutch.

3. A lawn mower comprising a cutter shaft, a cutter reel, and a clutch between said parts located at the center of the reel.

4. In a gang lawn mower the combination of a gang frame, a mower unit therein comprising a cutter shaft, and a cutter reel having a clutch connecting it with said shaft, an operating member for said clutch mounted on the gang frame and connections from said member to said clutch adapted also to lift the reel.

5. In a gang lawn mower, the combination with a series of mower units, comprising ground wheels, a cutter shaft driven thereby, a cutter reel mounted concentric with the cutter shaft and a clutch between said shaft and reel.

6. In a lawn mower, a pair of ground wheels, a cutter shaft geared thereto, a cutter reel sleeved on the shaft, and a clutch forming a driving connection between the shaft and reel.

7. In a lawn mower, a pair of ground wheels, a cutter shaft geared thereto, a cutter reel mounted concentrically to said shaft and a clutch between said shaft and reel located at the middle of the latter.

8. In a lawn mower, a pair of ground wheels, a cutter shaft driven thereby, a cutter reel, and a driving connection between the shaft and reel comprising clutch-elements and a housing inclosing and protecting the same.

9. In a lawn mower, a cutter shaft having a clutch-member fast thereon, a cutter reel concentrically mounted with respect to said shaft and inclosing the same and including a housing for said clutch-member and provided with a complementary clutch element adapted for engagement with said shaft clutch member within the housing.

In testimony whereof I have signed this specification in the presence of two witnesses.

CHARLES C. WORTHINGTON.

Witnesses:
 JOHN T. CROWLEY,
 K. L. GRANT.